(12) United States Patent
Arnold et al.

(10) Patent No.: US 8,002,330 B2
(45) Date of Patent: Aug. 23, 2011

(54) INTERIOR TRIM COMPONENT AND METHOD OF FORMING THE SAME

(75) Inventors: Dennis L. Arnold, Davidson, MI (US);
Michael A. West, Howell, MI (US);
Robert J. Valcke, Shelby Township, MI (US)

(73) Assignee: Magna International Inc., Aurora (CA)

( * ) Notice: Subject to any disclaimer, the term of this patent is extended or adjusted under 35 U.S.C. 154(b) by 309 days.

(21) Appl. No.: 11/694,069

(22) Filed: Mar. 30, 2007

(65) Prior Publication Data
US 2008/0241457 A1    Oct. 2, 2008

(51) Int. Cl.
*B60J 5/04*    (2006.01)
*B32B 3/16*    (2006.01)

(52) U.S. Cl. ........ 296/146.7; 296/39.1; 428/54; 428/55; 428/56

(58) Field of Classification Search ............ 428/319.3, 428/319.7, 316.6, 54–56; 296/146.7, 39.1
See application file for complete search history.

(56) References Cited

U.S. PATENT DOCUMENTS

| 5,304,273 A * | 4/1994 | Kenrick et al. ............ 156/219 |
| 7,159,914 B2 * | 1/2007 | Svenson ...................... 296/1.08 |
| 2008/0032094 A1 * | 2/2008 | Raghavendran et al. ..... 428/138 |

* cited by examiner

*Primary Examiner* — Hai Vo
(74) *Attorney, Agent, or Firm* — Honigman

(57) ABSTRACT

An interior trim component includes an aerated skin layer and a glass-reinforced urethane substrate layer. A method for manufacturing an interior trim component is also disclosed. The method includes the steps of aerating a skin layer into a molding tool and depositing a glass-reinforced urethane substrate layer over the aerated skin layer.

1 Claim, 6 Drawing Sheets

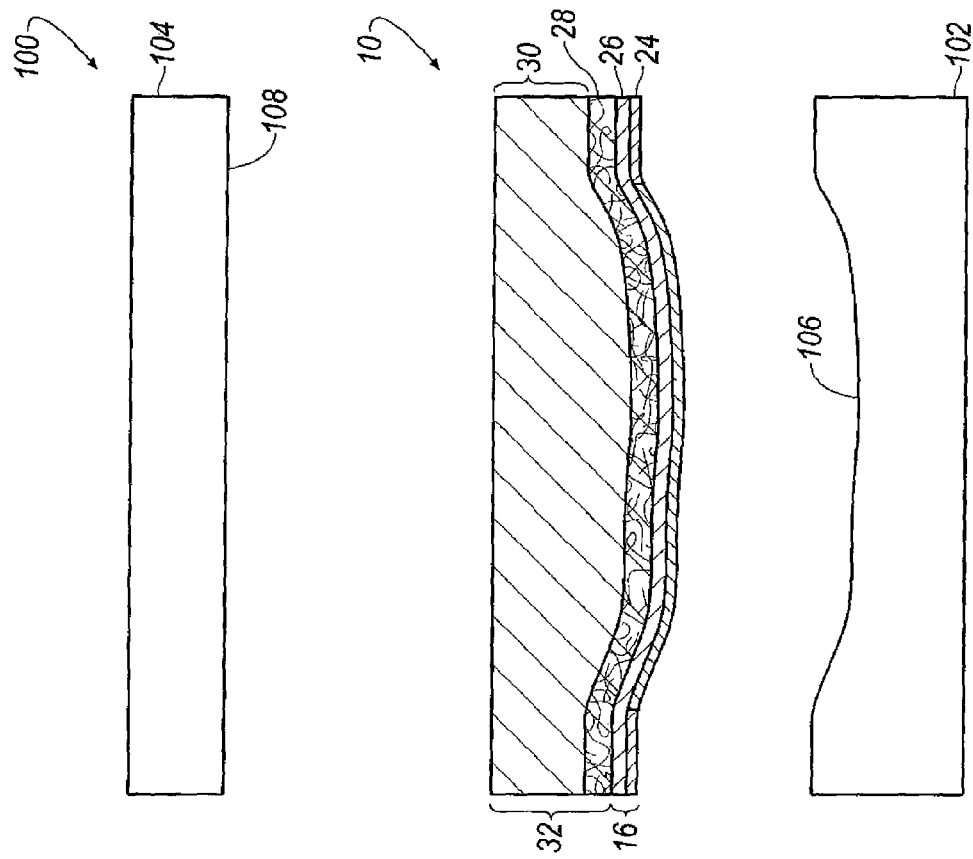
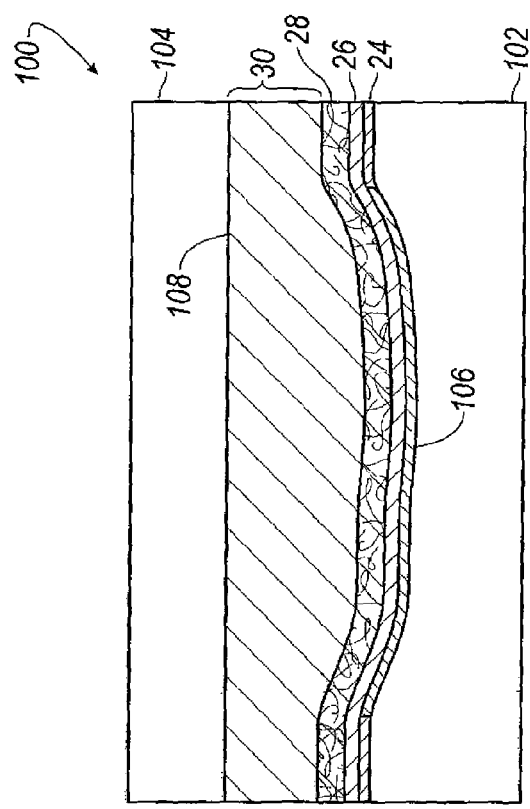
FIG. 3E
FIG. 3F

US 8,002,330 B2

INTERIOR TRIM COMPONENT AND METHOD OF FORMING THE SAME

FIELD OF THE INVENTION

The invention relates in general to an interior trim component and method of manufacturing the same.

BACKGROUND OF THE INVENTION

Interior trim components may be found, for example, in the passenger compartment area of a vehicle. Functionally, interior trim components cover structure of a vehicle and provide an aesthetically-pleasing surface, which is commonly referred to in the art as an "A-surface" or a "show surface," that is viewable by vehicle occupants.

Conventional interior trim components may include one or more portions of vinyl (or similar cover-stock material) that define the A-surface. Typically, the one or more portions of vinyl material may be vacuum-formed in a molding apparatus. During molding within the vacuum-form molding apparatus, portions of the A-surface may be undesirably stretched by the vacuum, thereby upsetting the quality of the A-surface of interior trim component. Additionally, if more than one portion of vinyl material defines the A-surface of the interior trim component, additional steps are introduced in the method of forming the interior trim component, thereby increasing the time and cost to manufacture the interior trim component while also increasing the likelihood that the manufacturing of the interior trim component may fail as a result of introducing additional layers into the molding apparatus.

SUMMARY OF THE INVENTION

In accordance with the invention there is provided, an interior trim component, comprising an aerated skin layer, and a glass-reinforced urethane substrate layer. The aerated skin layer is selected from the group consisting of polyurethane (PU), thermoplastic urethane (TPU), poly vinyl chloride (PVC), and thermoplastic elastomer (TPE).

In accordance with another aspect of the invention, the interior trim component further comprises one or more aerated in-mold-coating paint layers deposited over the aerated skin layer.

In accordance with an embodiment of the invention, the one or more aerated in-mold coating paint layers include a first paint layer defining a first color, and a second paint layer defining a second color, wherein the first color is different than that of the second color. In accordance with an embodiment of the invention, the first color defines a door body portion, and the second color defines a door bolster portion.

In accordance with another embodiment of the invention, the one or more aerated in-mold coating paint layers and/or the aerated skin layer defines a first texture/grain pattern, and a second texture/grain pattern, wherein the first texture/grain pattern is different than that of the second texture/grain pattern.

In accordance with another aspect of the invention, the glass reinforced urethane layer includes a fiberglass layer cured with a rigid urethane substrate layer. In accordance with an embodiment, the fiberglass layer is a fiberglass layer mat. In accordance with a further embodiment, the fiberglass layer includes chopped glass fibers.

Furthermore, in accordance with the invention there is provided, a method of manufacturing an interior trim component, comprising the steps of aerating a skin layer into a molding tool, and depositing a glass-reinforced urethane substrate layer over the aerated skin layer.

In accordance with another aspect of the invention, the method comprises the further step of aerating one or more in-mold-coating paint layers over a surface of the molding tool prior to the step of aerating the skin layer.

In accordance with an embodiment of the invention, wherein the step of aerating one or more in-mold coating paint layers includes the steps of aerating a first paint layer over the surface of the molding tool to define a door body portion having a first color; and aerating a second paint layer over the surface of the molding tool to define a door bolster portion having a second color, wherein the first color is different than that of the second color, wherein the one or more aerated in-mold coating paint layers and/or the aerated skin layer defines a first texture/grain pattern, and a second texture/grain pattern, wherein the first texture/grain pattern is different than that of the second texture/grain pattern.

In accordance with a further embodiment of the invention, the step of depositing said glass reinforcement urethane layer includes the steps of depositing a fiberglass reinforcement layer over said aerated skin layer, and depositing a rigid urethane substrate over said fiberglass reinforcement layer.

In accordance with another embodiment of the invention, the fiberglass reinforcement layer is a fiberglass layer mat. Furthermore, in accordance with yet a further embodiment of the invention, the fiberglass reinforcement layer includes chopped glass fibers.

In accordance with another aspect of the invention, the aerated skin layer is selected from the group consisting of polyurethane (PU), thermoplastic urethane (TPU), poly vinyl chloride (PVC), and thermoplastic elastomer (TPE).

This and other objects of the invention can be more fully appreciated from the following detailed description of the preferred embodiments.

BRIEF DESCRIPTION OF THE DRAWINGS

Exemplary embodiments of the invention will now be described in conjunction with the following drawings wherein like numerals represent like elements, and wherein:

FIGS. 3A-3F illustrate a method of forming the interior trim component of FIG. 1 in accordance with an exemplary embodiment of the invention.

DETAILED DESCRIPTION OF THE PREFERRED EMBODIMENTS

The Figures illustrate an exemplary embodiment of an interior trim component and method of manufacturing the same in accordance with an embodiment of the invention. It is to be generally understood that the nomenclature used herein is simply for convenience and the terms used to describe the invention should be given the broadest meaning by one of ordinary skill in the art.

Figure 1:
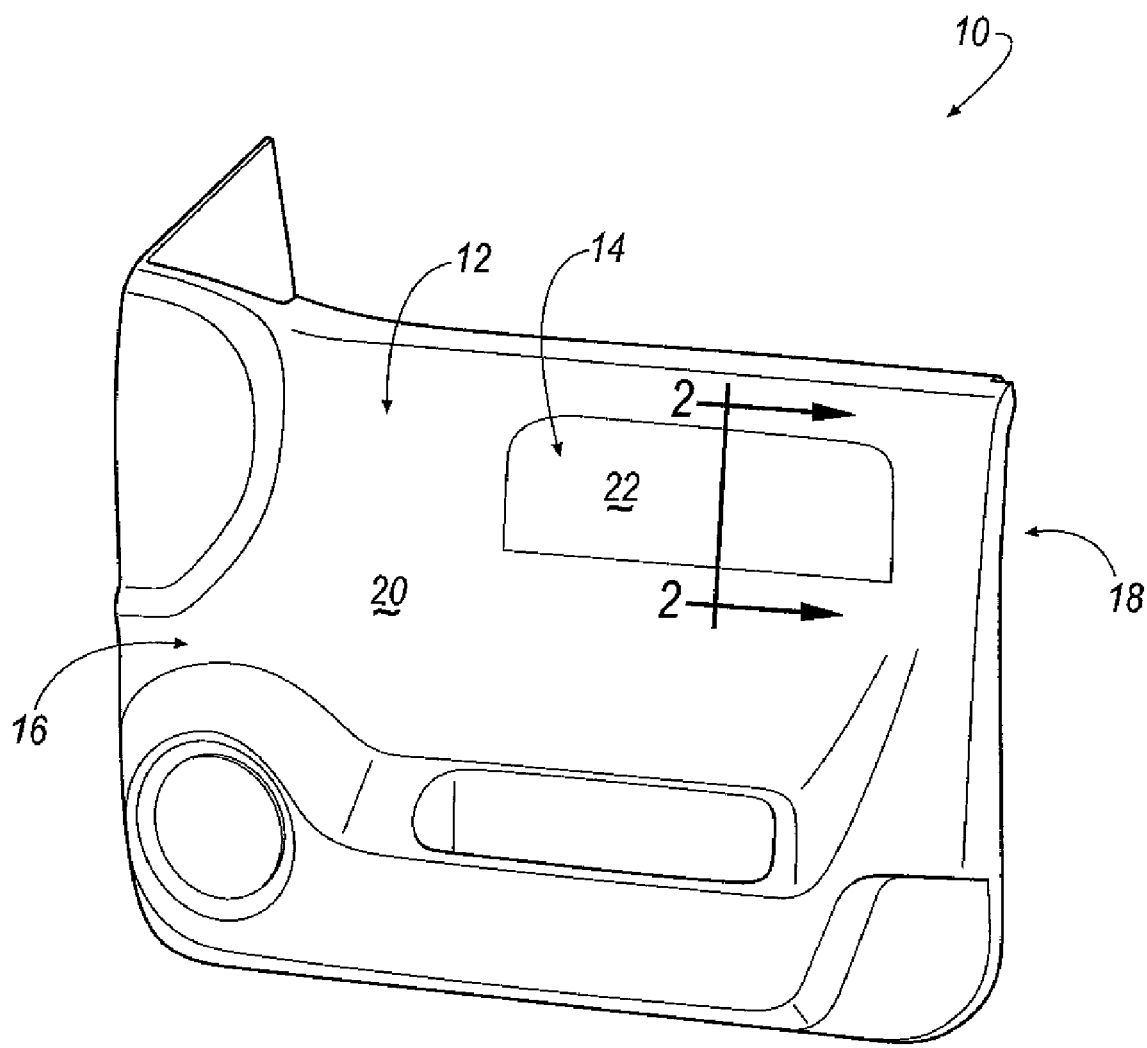
FIG. 1 is a perspective view of an interior trim component in accordance with an exemplary embodiment of the invention.

Referring to FIG. 1, an interior trim component is shown generally at 10 according to an embodiment. The interior trim component 10 may be formed to have any desirable geometry, such as, for example, door trim, as shown in FIG. 1. Alternatively, the interior trim component 10 may be formed to define any geometry, such as, for example, an instrument panel geometry, a headliner geometry, a load floor geometry, or the like.

As illustrated in FIG. 1, the geometry of the interior trim component 10 is generally defined to include a body portion 12 and a bolster portion 14. In an embodiment, the bolster may include an aesthetically-pleasing surface that is differentiated from the body portion 12 in one way. It will be appreciated that the bolster portion 14 should not be limited to an aesthetically-pleasing bolster and may be broadly construed to include, for example, portions that include functionality, such as, for example, an armrest portion, a control switch bezel, a map pocket, a handle bezel, or the like.

When joined to vehicle structure (not shown), at least a portion of the interior trim component 10 defines an A-surface 16 having a portion that faces and is exposed to a passenger compartment area of a vehicle and a B-surface 18 having a portion that faces the vehicle structure. If desired, the body portion 12 is defined to include an A-surface body portion 20 defined by a first color, and the bolster portion 14 is defined to include a second A-surface bolster portion 22 defined by a second color that is different from the first color.

The first and second A-surface portions 20, 22 may be further defined to Include an A-surface texture/grain characteristic. The A-surface portion 20 of the body portion 12 may be defined to include, for example, a first A-surface texture/grain, and the A-surface portion 22 of the bolster portion 14 may be defined to include, for example, a second A-surface texture/grain that is different from the first A-surface texture/grain.

According to an embodiment, the first A-surface texture/grain may be defined by a relatively smooth A-surface texture/grain, and the second A-surface texture/grain may be defined by a faux leather or fabric A-surface texture/grain. It will be appreciated that above-described A-surface texture/grains are not limited to a smooth, leather, or fabric texture/grain and that any desirable A-surface texture/grain pattern may define the first and second A-surface portion 20, 22 of the interior trim component 10.

Figure 2:
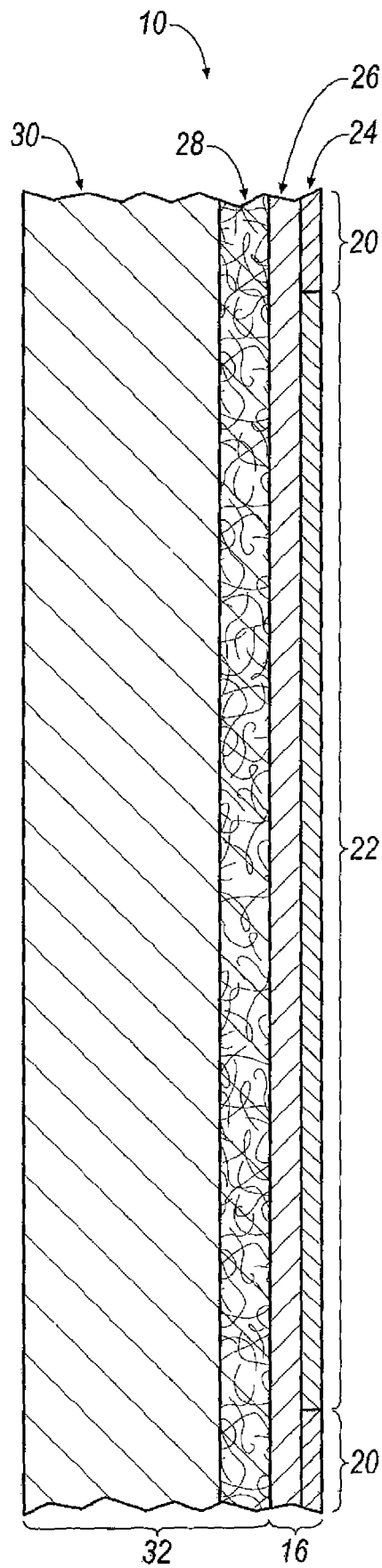
FIG. 2 is a cross-sectional view of the interior trim component of FIG. 1 according to line 2-2.

Referring to FIG. 2, the interior trim component 10 may define a four layer structure including, for example, one or more in-mold-coating (IMC) paint layers 24, a skin layer 26, a structural reinforcement layer 28, and a rigid substrate layer 30. According to an embodiment, the reinforcement layer 28 may prevent the rigid substrate layer 30 from cracking.

According to an embodiment, the one or more IMC paint layers 24 may define the color of the A-surface portions 20, 22. According to an embodiment, the one or more IMC paint layers 24 and/or the skin layer 26 may define the A-surface 16 as having one or more color and/or texture/grain characteristics. According to an embodiment, the skin layer 26 may include any desirable material, such as, for example, polyurethane (PU), thermoplastic urethane (TPU), poly vinyl chloride (PVC), thermoplastic elastomer (TPE), or the like.

According to an embodiment, the structural reinforcement layer 28 may include, for example, a porous material, such as, for example, a fiberglass mat. In an embodiment, the structural reinforcement layer 28 may include, for example, a random distribution of chopped glass fibers.

According to an embodiment, the rigid substrate layer 30 may include any desirable material, such as, for example, a foamed material, such as, for example, urethane. Once deposited over the glass layer 28, the urethane layer 30, in combination with the glass layer 28, may be referred to as a glass-reinforced urethane (GRU) layer 32. Although FIG. 2 generally illustrates two discrete layers at reference signs 28 and 30, the GRU layer 32 is generally one layer of material such that the urethane 30 seeps into, and subsequently cures with, the porous glass layer 28 to define the GRU layer 32. According to an embodiment, the urethane layer 30 may seep through the glass layer 28 and cure with the skin layer 26.

Referring to FIGS. 3A-3F and FIG. 4, a method 200 of forming the interior trim component 10 is shown according to an embodiment. According to an embodiment, the interior trim component 10 is formed in a molding tool 100 defined by a lower half 102 and an upper half 104. The lower mold half 102 is generally defined by a first mold surface 106. The upper mold half 104 is generally defined by a second mold surface 108.

When the lower and upper halves 102, 104 are moved from an open position (FIG. 3A) to a closed position (FIG. 3E) the first and second mold surfaces 106, 108 generally define a cavity 110 that provides a geometry of the interior trim component 10. Prior to providing the layers 24-30 into the molding tool 100, the first and second surfaces 106, 108 are heated to approximately 1250 F-1600 F to permit the layers 24-30 to cure when deposited into the molding tool 100.

Figure 3B:
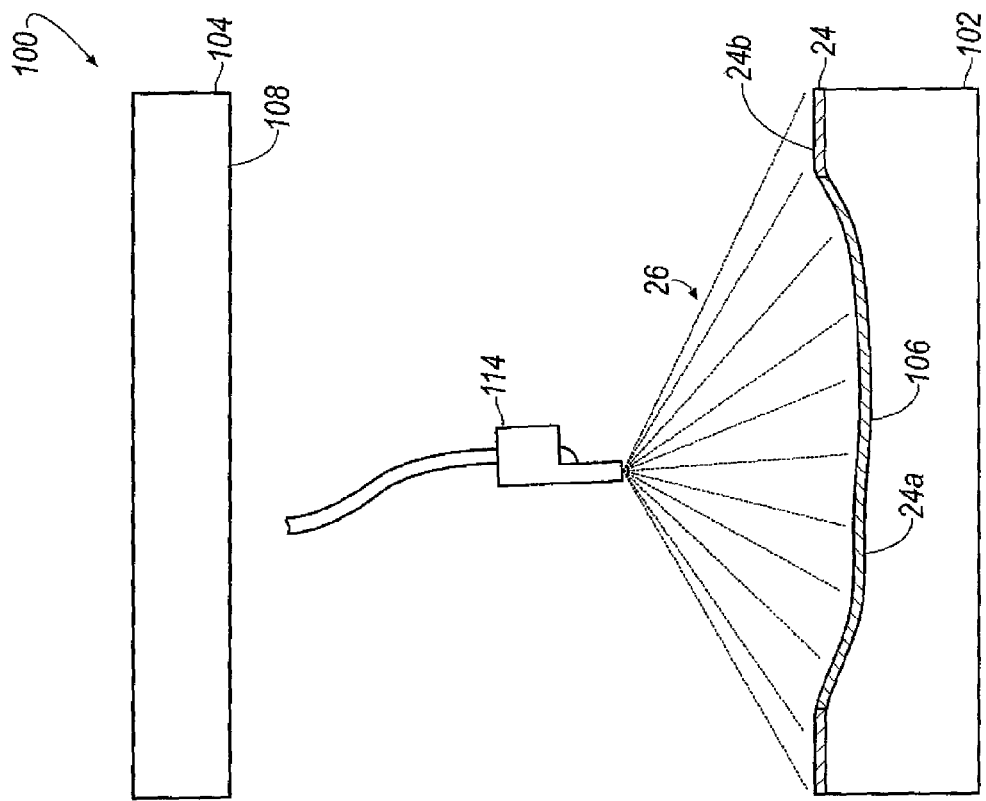
Figure 3A:
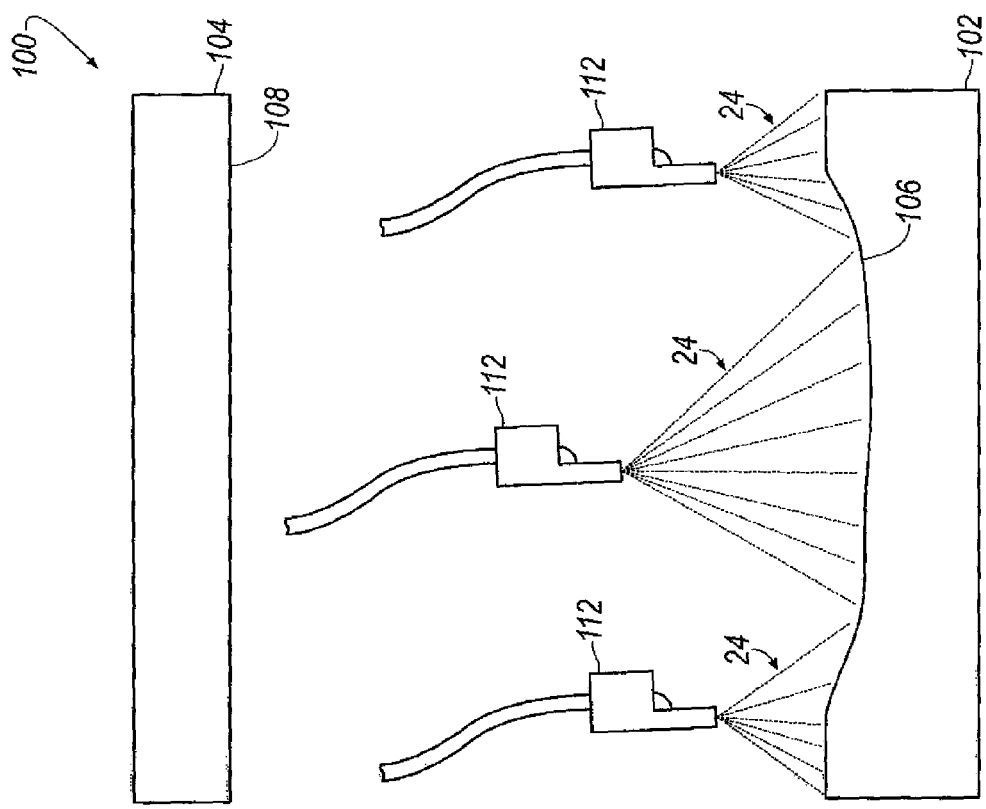
Figure 4:
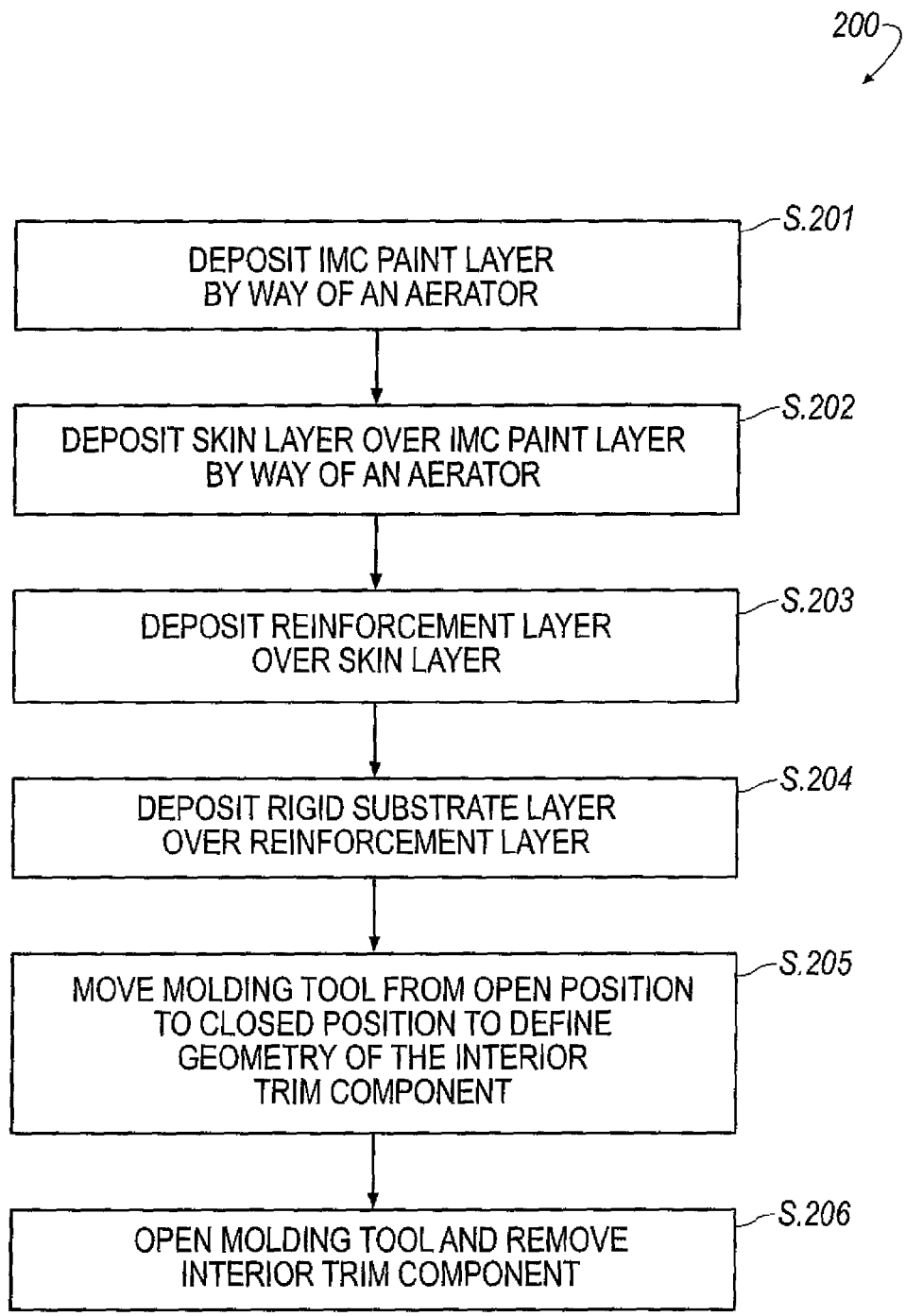
FIG. 4 illustrates a method of manufacturing an interior trim component in accordance with an exemplary embodiment of the invention.

Referring to FIGS. 3A and 4, the interior trim component 10 is formed by first aerating, at step S.201, the IMC paint layer 24 on the first surface 106 of the lower mold half 102. According to an embodiment, the IMC paint layer 24 may be delivered to the first surface 106 by any desirable tool, such as, for example, a spray gun and hose assembly 112. The spray gun and hose assembly 112 may be moved and controlled by robotic means (not shown). Alternatively, if desired, the spray gun and hose assembly 112 may be incorporated into the upper mold half 104. According to an embodiment, the one or more IMC paint layers 24 may be approximately 50 μm (microns) thick.

Once delivered onto the first surface 106, the IMC paint layer 24 is generally defined to include a front, A-surface 24a and a rear, B-surface 24b. Once the one or more IMC paint layers 24 have cured, the skin layer 26 is deposited, at step S.202, over the rear, B-surface 24b of the IMC paint layer 24, as shown in FIGS. 3B and 4. According to an embodiment, the skin layer 26 may be delivered over the B-surface 24b of the IMC paint layer 24 by any desirable tool, such as, for example, an aerator defined by, for example, a spray gun and hose assembly 114. The spray gun and hose assembly 114 may be moved and controlled by robotic means (not shown). Alternatively, if desired, the spray gun and hose assembly 114 may be incorporated into the upper mold half 104. According to an embodiment, the skin layer 26 maybe approximately 3.00 mm thick.

Once delivered onto the IMC paint layer 24, the skin layer 26 is generally defined to include a front, A-surface 26a and a rear, B-surface 26b. Once the skin layer 26 has cured, the reinforcement layer 28 is deposited, at step S.203, over the 20 rear, B-surface 26b of the skin layer 26, as shown in FIGS. 3C and 4. According to an embodiment, the reinforcement layer 28 may be deposited manually by an operator, or, alternatively, by a robotic means (not shown). In another embodiment, the reinforcement layer 28 may be delivered as chopped glass fibers over the B-surface 26b of the skin layer 26 by any desirable tool, such as, for example, a chopped glass delivery system (not shown). According to an embodiment, the reinforcement layer 28 may be approximately 0.50 mm-0.75 mm thick.

Figure 3D:
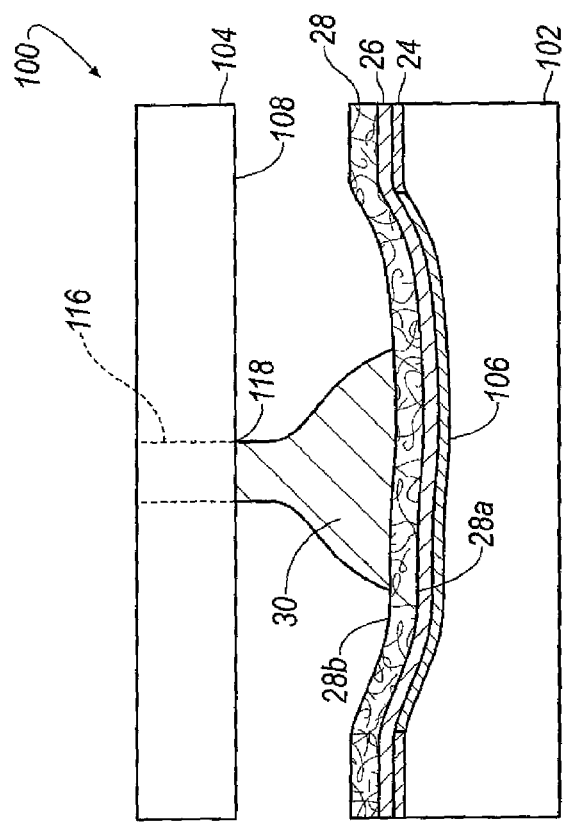
Figure 3C:
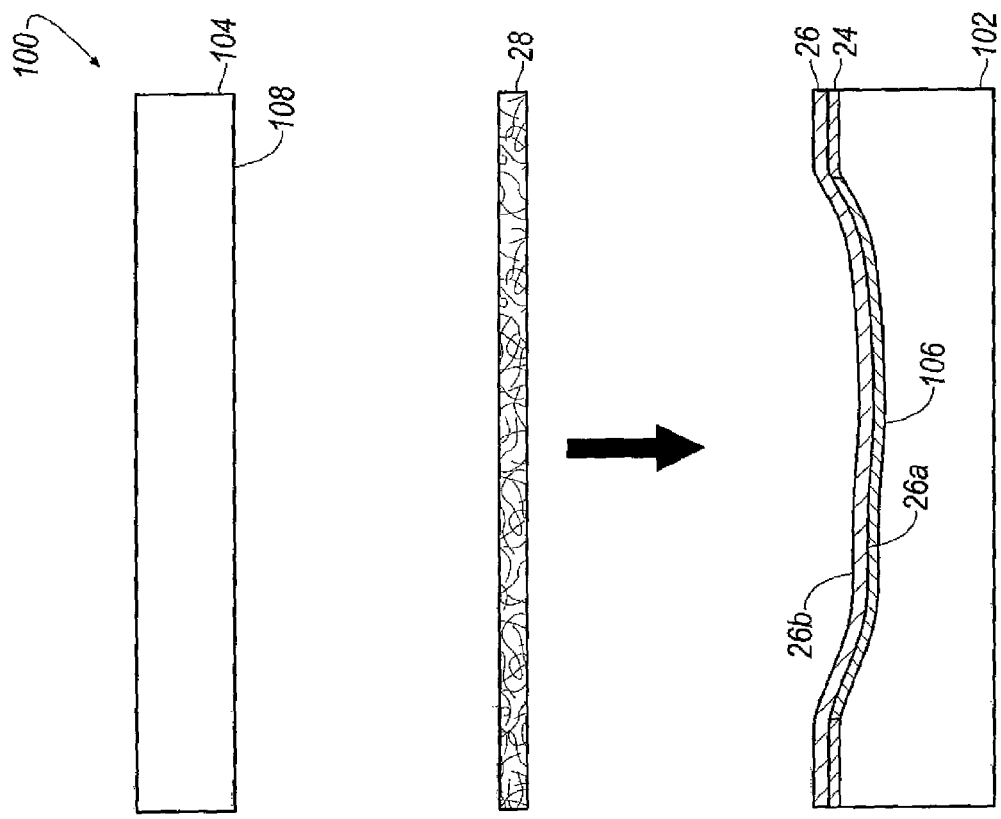

Once delivered onto the skin layer 26, the reinforcement layer 28 is generally defined to include a front, A-surface 28a and a rear, B-surface 28b; the rigid substrate layer 30 is then deposited, at step S.204, over the rear, B-surface 28b of the reinforcement layer 28, as shown in FIGS. 3D and 4. According to an embodiment, the rigid substrate layer 30 may be delivered over the rear, B-surface 28b. According to an embodiment, the rigid substrate layer 30 may be deposited by a robotic means (not shown). Alternatively, for example, the rigid substrate layer 30 may be deposited by way of a distribution system that may be, for example, incorporated as part of the mold tool 100 by way of a passage 116 formed in the upper mold half 104; as such, the rigid substrate layer 30 may be deposited over the rear, B-surface 28b through a sprue 118 located on or within the second mold surface 108 of the upper mold half 104. According to an embodiment, the rigid substrate layer 30 may be approximately 0.25 mm-0.50 mm thick.

Referring to FIGS. 3E and 4, the lower and upper halves 102, 104 are moved, at step S.205, from the open position to the closed position to define the cavity 110 that provides a geometry of the interior trim component 10. When moved to the closed position, the rigid substrate layer 30 cures and hardens for a period of time approximately, for example, two minutes. Referring to FIGS. 3F and 4, once the rigid substrate layer 30 has cured, the interior trim component 10 may be removed, at step S.206, from the molding tool 100.

Because the one or more IMC paint layers 24 and the skin layer 26 are deposited into the molding tool 100 by an aerator (e.g., the spray gun), a desired, repeatable A-surface 16 is provided for successively-formed interior trim components 10. If the interior trim component 10 includes a geometry defining substantially steep curvatures, valleys, recesses, and the like, texture/grain "wash out" (i.e., the destruction/upsetting of the texture/grain pattern) is substantially eliminated by providing the one or more IMC paint layers 24 and skin layer 26 by way of an aerator (e.g., the spray gun) as opposed to depositing pre-formed layers having a texture/grain pattern onto a mold surface and then vacuum-forming the layers as discussed above.

In addition, it will be appreciated that the interior trim component 10 includes a single skin layer 26 including any desirable number of IMC paint layers 24 that defines, for example, a door body portion 12, a door bolster portion 14, or the like. Although a plurality of IMC paint layers 24 and/or skin layer 26 generally defines one or more colors and/or texture/grain patterns of the interior trim component 10, it will be appreciated that the one or more IMC paint layers 24 and skin layer 26 generally represents a unitary A-surface 16 that eliminates an incorporation of more than one skin layer (e.g., as associated with two or more vinyl layers) discussed above.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An interior trim component comprising:
an aerated in-mold coating paint layer having two or more separate paint segments sprayed onto a mold adjacent each other, each paint segment defining a corresponding region of the interior trim component;
an aerated skin layer sprayed over the in-mold-coating paint layer such that the aerated skin layer is formed integrally with the in-mold-coating paint layer to provide a unitary layer; and
a glass-reinforced urethane substrate layer disposed on the skin layer and formed in the mold with the in-mold coating paint layer and the skin layer to a shape of the interior trim component, the glass-reinforced urethane substrate layer including a fiberglass layer disposed on the skin layer and cured with a rigid urethane substrate layer disposed on the fiberglass layer;
wherein the aerated in-mold coating paint layer substantially prevents surface texture/grain pattern distortion during a molding process of the interior trim component, wherein the in-mold coating paint layer forms a front, display surface of the interior trim component, a first paint segment of the in-mold coating paint layer defining a door body portion of the front, display surface and a second paint segment of the in-mold coating paint layer defining a door bolster portion of the front, display surface, wherein the first and second paint segments each comprise a different color and a different surface texture/grain pattern, the first paint segment formed separately around the second paint segment such that the door body and door bolster portions of the front, display surface of the interior trim component are discernable from each other by a common border.

* * * * *